Patented Aug. 14, 1945

2,382,769

UNITED STATES PATENT OFFICE 2,382,769

VULCANIZATION ACCELERATORS

Robert T. Armstrong, New York, N. Y., assignor to United States Rubber Company, New York, N. Y., a corporation of New Jersey No Drawing. Application June 20, 1942, Serial No. 447,839

9 Claims. (Cl. 260—791)

This invention relates to the treatment of rubber and to the production of vulcanized goods therefrom. More particularly, the invention relates to a new class of vulcanization accelerators.

According to the invention a vulcanizable rubber stock is vulcanized in the presence of a pyridazine sulfide in which the pyridazine ring is a closed ring consisting of 4 carbon atoms and 2 adjacent nitrogen atoms and in which a sulfur atom is directly attached to at least one of the carbon atoms directly attached to the nitrogen atoms of the ring. Benzo-condensed pyridazine rings, that is, the phthalazines, and alkyl, aryl, or cyclo-alkyl-substituted pyridazines are included. More specifically and outstanding are those compounds containing the grouping:

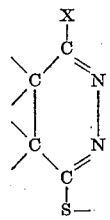

where X is hydrogen, aryl, or alkyl.
Exemplary of such chemicals are:
3-mercapto-6-methyl pyridazine

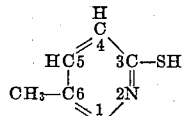

3-mercapto-4,5-dihydro-6-methyl pyridazine

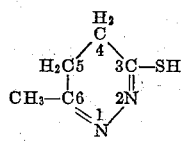

1-mercapto-4-phenyl-phthalazine

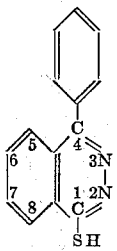

By suitable attachment with the thiol sulfur atom, ammonium or amine salts of any of the above described chemicals, as well as their salts with bivalent metals, such as zinc, cadmium, or lead, may be formed and used without departing from the invention. Similarly, the corresponding disulfide, 1,1'-dithiobis (4-phenyl-phthalazine), may be used. The diazine nucleus may have hydrogen, or alkyl, cyclo-alkyl, or aryl groups as substituents.

The chemicals may be prepared by the reaction of gamma-oxo acids with hydrazine, followed by treatment of the resulting hydroxy dihydro pyridazine with phosphorus pentasulfide. Similarly, an aromatic compound having an aldehyde or ketone group and a carboxylic acid group (or a compound with two carboxylic acid groups) in ortho positions on the benzene nucleus, such as, for example, ortho-benzoyl benzoic acid, may be reacted with the hydrazine and then treated with phosphorus pentasulfide to yield the corresponding mercaptan, in this case a 1-mercapto-4-phenyl benzo (d) pyridazine.

The following examples illustrate specific processes which lead to particular members of this class of accelerators:

EXAMPLE 1

116 gms. of levulinic acid are dissolved in 200 cc. of water and 130 gms. of hydrazine sulfate added. Then 80 gms. of sodium hydroxide are added in 100 cc. of water while cooling. The 3-hydroxy 4,5 dihydro-6-methyl pyridazine crystallizes from the water solution and has a melting point of 104° C. 50 gms. of this material are dissolved in 300 cc. of xylene and 100 gms. of finely powdered phosphorus pentasulfide are added. This mixture is heated at 85° C. for 4 hours. The solid residue is filtered and digested for 1 hour with 500 cc. of water at the boiling point. After standing 10 to 24 hours, 3-mercapto-4,5-dihydro-6-methyl pyridazine crystallizes from the solution. A sample recrystallized from glacial acetic acid has a melting point of 182° to 185° C. and analysis gives the following results:

|  | Per cent |
|---|---|
| Sulfur found | 25.2 |
| Theory | 25.0 |

EXAMPLE 2

37 gms. of 3-oxy-5,6-dihydro-6-methyl pyridazine, prepared as above, are dissolved in 100 gms. of glacial acetic acid and 52.8 gms. of bromine are slowly added while cooling. 3-hydroxy-6-methyl pyridazine separates from the solution.

320 gms. of this material are heated with 60 gms. of phosphorus-oxy-chloride for ½ hour at 185° C. The excess phosphorus-oxy-chloride is removed by vacuum distillation. 10 gms. of ice and a solution of 20 gms. of sodium hydroxide in 50 cc. of water are added to the residue. 3-chloro-6-methyl pyridazine precipitates. 10 gms. of this chloro body are heated with 7.5 gms. of potassium hydrosulfide in alcohol solution for 6 hours at 75° C. It is then filtered and evaporated until crystals of 3-mercapto-6-methyl pyridazine separates. Melting point is 202 to 205° C.

*Analysis*

| | Per cent |
|---|---|
| Sulfur found | 24.2 |
| Theory | 25.4 |

Example 3

50 gms. of 1-hydroxy 4-phenyl phthalazine (prepared from ortho-benzoyl benzoic acid and hydrazine hydrate) are mixed with 50 gms. of finely ground phosphorus pentasulfide in 200 cc. of xylene and heated for 2 hours at a temperature of 100 to 136° C. on an oil bath. The mixture is then poured into 1 liter of hot water and the xylene removed by steam distillation. The crude product separates. Filter, take up the product in dilute sodium hydroxide, filter the solution and precipitate the product, 1-mercapto, 4-phenyl phthalazine, with dilute hydrochloric acid. A sample recrystallized from alcohol yields yellow crystals, melting point 208 to 209° C.

*Analysis*

| | Per cent |
|---|---|
| Sulfur found | 13.5 |
| Sulfur (theory) | 13.4 |

Example 4

An excess of ice and hydrogen peroxide is added to a dilute sodium hydroxide solution of 1-phenyl-4-mercapto phthalazine. Yellow crystals of the disulfide separate, melting point 118 to 120° C.

Example 5

35 gms. of 2,4-dihydroxy phthalazine (prepared from di-ethyl phthalate and hydrazine hydrate) are mixed with 105 gms. of phosphorus pentasulfide in 300 cc. of xylene and heated under reflux for 6 hours. Filter and then digest the residue with dilute sodium hydroxide. Filter again and precipitate the product with dilute hydrochloric acid. Recrystallize this material from water. Yellow needles, melting point 200 to 201° C.

In further illustration of the invention, the following examples are given to show the accelerating power of some of these chemicals in a typical tread compound (Table I) and in a typical gum stock (Table II), the parts being by weight:

*Table I*

| | A | B | C | D |
|---|---|---|---|---|
| Smoked sheet | 100 | 100 | 100 | 100 |
| Carbon black | 45 | 45 | 45 | 45 |
| Softener | 7 | 7 | 7 | 7 |
| Sulfur | 3 | 3 | 3 | 3 |
| 3-mercapto-4, 5-dihydro-6-methyl pyridazine | 0.5 | | | |
| 3-mercapto-6-methyl pyridazine | | 0.5 | | |
| 1-mercapto-4-phenyl phthalazine | | | 0.8 | |
| Disulfide of 1-mercapto-4-phenyl phthalazine | | | | 1.2 |

The finely ground chemical is added to the tread compound on a laboratory mill at approximately 180° F. and then is cured under pressure in a mold for the time and temperature indicated below with the following results:

| | Tensile strength, lbs. per sq. in. | | | |
|---|---|---|---|---|
| | A | B | C | D |
| 60 minutes at 134° C | 4,100 | | | 4,200 |
| 75 minutes at 134° C | 3,900 | | 3,700 | 4,200 |
| 35 minutes at 146° C | 4,100 | 3,800 | 3,400 | |

| | Elongation | | | |
|---|---|---|---|---|
| | A | B | C | D |
| | *Percent* | *Percent* | *Percent* | *Percent* |
| 60 minutes at 134° C | 650 | | | 550 |
| 75 minutes at 134° C | 620 | | 570 | 550 |
| 35 minutes at 146° C | 630 | 540 | 540 | |

*Table II*

| | E | F |
|---|---|---|
| Pale crepe | 100 | 100 |
| Zinc oxide | 10 | 10 |
| Stearic acid | 2 | 2 |
| Sulfur | 3 | 3 |
| 1-phenyl-4-mercapto-phthalazine | 1.0 | |
| Disulfide of 1-phenyl-4-mercapto-phthalazine | | 1.0 |

The above chemicals are mixed on a laboratory mill at a temperature of about 150° C. and then cured under pressure in a mold for the time and temperature indicated below, with the following results:

| | Tensile strength, lbs. per sq. in. | |
|---|---|---|
| | E | F |
| 60 minutes at 134° C | 3,300 | 3,500 |
| 75 minutes at 134° C | 3,800 | 3,600 |
| 35 minutes at 146° C | 3,200 | 2,800 |
| 50 minutes at 146° C | 3,400 | 2,800 |

| | Elongation at break in percent of original elongation | |
|---|---|---|
| | E | F |
| 60 minutes at 134° C | 760 | 830 |
| 75 minutes at 134° C | 820 | 820 |
| 35 minutes at 146° C | 790 | 830 |
| 50 minutes at 146° C | 870 | 830 |

Examples of further chemicals within the scope of the invention are:

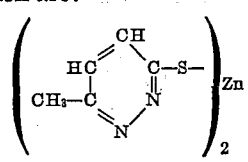

The zinc salt of 3-mercapto-6-methyl pyridazine

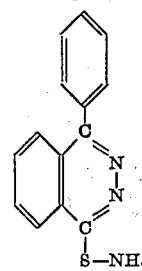

Ammonium salt of 1-mercapto-4-phenyl phthalazine

The compounds may be used in the presence or absence of adjuvants, such as ammonia compounds, amines, amine salts, and organic bases in general, including urea and the diaryl guanidines and their acyl derivatives. They may further be used in conjunction with other accelerators, among them being the aldehyde-amines, dithiocarbamates, xanthates, mercaptobenzothiazoles, etc.

The new accelerators may be added to the rubber, in proportions ranging from 0.1% to 3% or higher, based on the weight of the rubber, by mill incorporation, by impregnation, by addition to latex or other dispersions thereof, or the rubber may be vulcanized in aqueous or organic solutions of the accelerator. The accelerators may be used in a variety of rubber mixes and the stocks subjected either to mold cures, air cures, ammonia cures, submarine cures, steam cures, etc.

Various compounding ingredients, such as fillers, pigments, softeners, antioxidants, antiscorch chemicals, or vulcanization retarders may be employed in practicing the invention. The accelerators may be used in the vulcanization of whole latex rubber or rubber recovered from latex by coagulation or separated from latex by mechanical or centrifugal creaming, or chemical creaming methods, as will be apparent to those skilled in the art.

The generic term "a rubber" is meant to designate generally, rubbery materials susceptible of vulcanization with sulfur, such as caoutchouc, balata, gutta percha, natural or artificially-prepared latex, synthetic rubber, and reclaims thereof.

The methods of using the various accelerating agents herein set forth, as to the quantity employed, time of vulcanization, the heat required, and the proportion of metal oxide, sulfur, and other ingredients, may be varied without departing from the principle of the invention.

Having thus described my invention, what I claim and desire to protect by Letters Patent is:

1. A process which comprises vulcanizing a rubber in the presence of an accelerator which is a pyridazine sulfide in which the pyridazine ring is composed of four carbons and two nitrogens and in which a carbon atom adjacent to one of the nuclear nitrogen atoms is directly attached to a non-nuclear sulfur atom.

2. A process which comprises vulcanizing a rubber in the presence of an ortho-diazine in which the diazine ring is composed of four carbons and two nitrogens and in which a non-nuclear sulfur atom is directly attached to a carbon atom adjacent to a nitrogen atom of the diazine ring.

3. A process which comprises vulcanizing a rubber in the presence of a mercapto ortho-diazine in which the diazine ring is composed of four carbons and two nitrogens and in which a mercapto group is attached to a carbon atom adjacent to a nitrogen atom in the ortho-diazine nucleus.

4. A process which comprises vulcanizing a rubber in the presence of a 3-mercapto-6-alkyl pyridazine.

5. A process which comprises vulcanizing a rubber in the presence of a mercapto-phthalazine.

6. A process which comprises vulcanizing a rubber in the presence of a 3-mercapto-4,5-dihydro-6-methyl pyridazine.

7. A process which comprises vulcanizing a rubber in the presence of a 3-mercapto-6-methyl pyridazine.

8. A process which comprises vulcanizing a rubber in the presence of a 1-mercapto-4-phenyl-phthalazine.

9. A rubber composition containing an ortho-diazine in which the diazine ring is composed of four carbons and two nitrogens and in which a non-nuclear sulfur atom is directly attached to a carbon atom adjacent to a nitrogen atom of the diazine ring.

ROBERT T. ARMSTRONG.